F. J. MORGAN.
AUTOMOBILE BODY AND SEATS.
APPLICATION FILED JUNE 26, 1911.

1,039,780.

Patented Oct. 1, 1912.
2 SHEETS—SHEET 1.

Witnesses
Martin H. Olsen.
Edwin Phelps

Inventor
Franklyn J. Morgan
By Rummler & Rummler
Attys.

F. J. MORGAN.
AUTOMOBILE BODY AND SEATS.
APPLICATION FILED JUNE 26, 1911.

1,039,780.

Patented Oct. 1, 1912.

2 SHEETS—SHEET 2.

Witnesses
Martin H. Olsen
Edwin Phelps

Inventor
Franklyn J. Morgan
By Rummler & Rummler
Attys.

UNITED STATES PATENT OFFICE.

FRANKLYN J. MORGAN, OF CHICAGO, ILLINOIS.

AUTOMOBILE BODY AND SEATS.

1,039,780. Specification of Letters Patent. Patented Oct. 1, 1912.

Application filed June 26, 1911. Serial No. 635,513.

*To all whom it may concern:*

Be it known that I, FRANKLYN J. MORGAN, a citizen of the United States of America, and a resident of Chicago, county of Cook, State of Illinois, have invented certain new and useful Improvements in Automobile Bodies and Seats, of which the following is a specification.

The main objects of this invention are to provide an improved arrangement and form of body and seats for motor driven vehicles capable of permitting three persons of normal proportions to sit comfortably side by side therein; to provide a device of this kind which is particularly adapted for automobile chasses of standard widths and so arranged that the operator's seat is in substantially the same transverse row with the two other seats, and that the normal movements of the operator in manipulating the steering mechanism and the other controlling mechanism are not interfered with by the occupants of such other seats.

An illustrative embodiment of this invention is shown in the accompanying drawing, in which—

Figure 1:
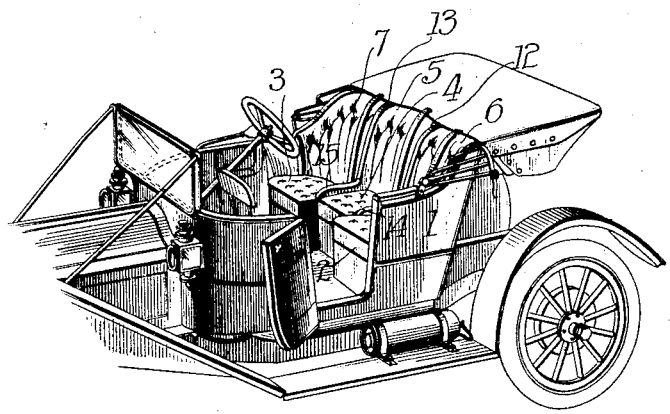
Figure 2:
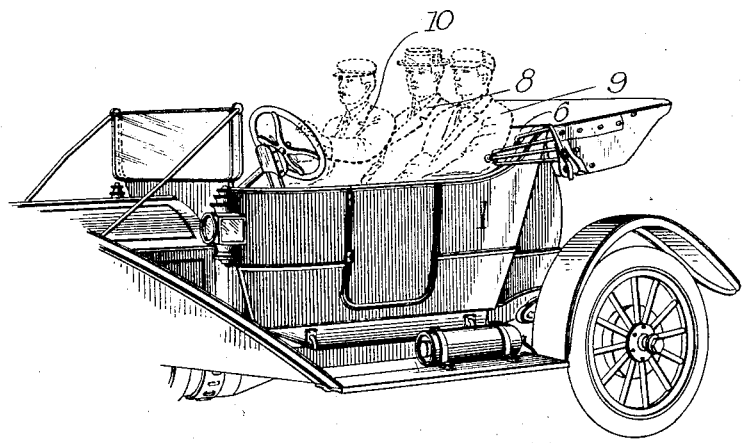
Figure 3:
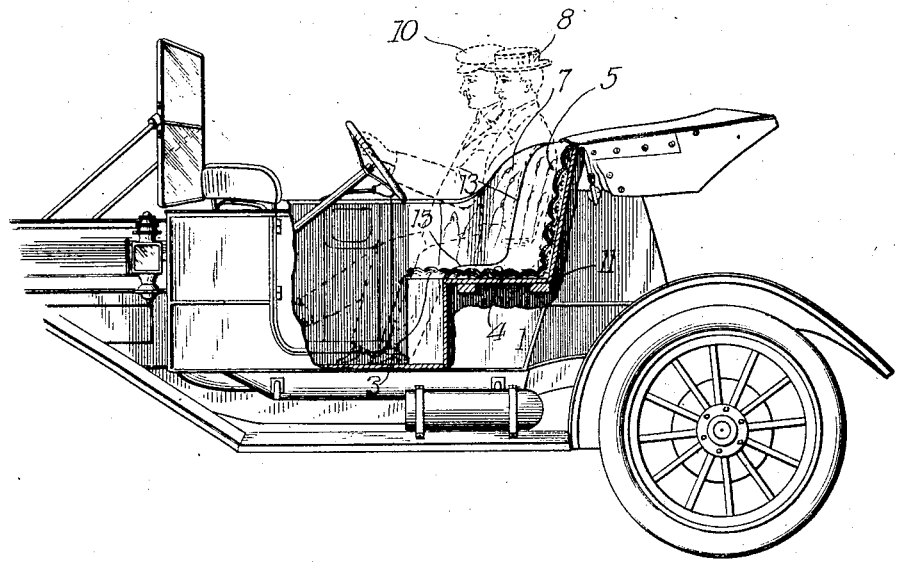
Figure 4:
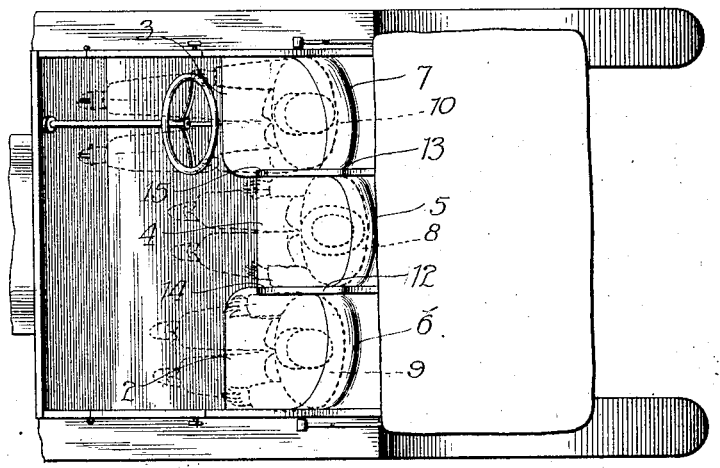

Figure 1 is a perspective view of a part of an automobile showing the seats constructed in accordance with this invention. Fig. 2 is a side view of the same showing three occupants seated therein. Fig. 3 is a side elevation of the same, the body being partly broken away to more clearly illustrate the arrangement of the seats or seat sections. Fig. 4 is a plan view of the same.

In small automobiles in common use before this invention, of the type in which all of the seats are in the same transverse row, it is practically impossible to permit three adult persons of average proportions to comfortably sit side by side without interfering with the movements of the operator in guiding and controlling the car. In the construction shown in the drawings, the body 1 is provided with three seats or seat sections 2, 3, and 4, with the middle seat or section 4 off-set rearwardly from the front line of the end seats 2 and 3, and with the back 5 of the middle seat correspondingly off-set rearwardly from the backs 6 and 7. This off-set of the middle seat and back is merely sufficient to allow the shoulders and arms of the occupant 8 of the middle seat to be overlapped slightly by the adjoining shoulders and arms of the occupants 9 and 10 of the adjoining seats. With this arrangement, only a slight overlapping of part of the shoulder and arm is required for comfort, for the reason that the widest part of the shoulder and arm of each occupant is slightly out of alinement with the widest part of the shoulder and arm of the adjoining occupant, so that the occupants may even be close enough for their shoulders and arms to touch and still permit comfortable seating and freedom of movement of the arms, particularly those of the operator and the occupant of the other outside or end seat. This arrangement provides for comfortably seating the three occupants side by side, all facing directly forward, in a comparatively small automobile body of practically the standard width, which ordinarily provides seating room for only two persons side by side, facing in the same direction. Even where, as in some present constructions, provisions for only two people is made in the front seat of the vehicle in the nature of two separately formed seats, the operator occupying one of such seats is unable to maintain his normal sitting position without having his movements more or less interfered with by the other occupant.

The seat and back frame 11 is upholstered in similar manner to other automobile seats, except that the upholstering is preferably made to form ridges 12 and 13 at the dividing lines between the backs, which ridges are extended at 14 and 15 along the dividing lines between the seats. Although the offset of the back 5 rearwardly of the adjoining backs 6 and 7 is but slight, as appears from Fig. 1, which is a reproduction of a photograph of an automobile body and seats constructed according to this invention, this offset is found in practice to be ample to give the desired comfort and freedom of movement, owing to the fact that the adjoining occupants, when leaning back naturally, have the widest parts of their shoulders and arms brought out of alinement with each other. It is found in practice that the desired result may be accomplished with an offset little more than the thickness of an arm of one of the occupants.

Although but one specific embodiment of this invention is herein shown and described, it will be understood that some of the details of the construction shown may be altered or omitted without departing from the spirit of this invention, as defined by the following claims.

I claim:—

1. An automobile body provided with three integral seats arranged in a single row adjacent the steering mechanism, all facing in substantially the same direction and each comprising a complete seat and back, the middle seat being abruptly off-set rearwardly of the line of the front edges of the adjoining end seats and having its back disposed correspondingly rearward of the backs of the end seats, substantially as and for the purpose specified.

2. An automobile body provided with a steering mechanism located at one side thereof, and three integral seats arranged in a single row, all facing in substantially the same direction and each comprising a complete seat and back, with one of the end seats located immediately rearward of said steering mechanism and with the middle seat abruptly off-set rearwardly of the line of the front edges of the adjoining end seats and having its back disposed correspondingly rearward of the backs of the end seats, substantially as and for the purposes specified.

3. An automobile body provided with a steering mechanism located at one side thereof, and three seats rigidly secured to said body in a single row, all facing in substantially the same direction and each comprising a complete seat and back, with one of the end seats located immediately rearward of said steering mechanism and with the middle seat abruptly off-set rearwardly of the line of the front edges of the adjoining end seats and having its back disposed correspondingly rearward of the backs of the end seats, substantially as and for the purposes specified.

Signed at Chicago this 21st day of June 1911.

FRANKLYN J. MORGAN.

Witnesses:
EDWIN PHELPS,
MARY A. MCILVAINE.

Copies of this patent may be obtained for five cents each, by addressing the "Commissioner of Patents, Washington, D. C."